(12) United States Patent
Kawahara et al.

(10) Patent No.: US 12,416,528 B2
(45) Date of Patent: Sep. 16, 2025

(54) DEVICE AND METHOD FOR SENSING AN OVER-TEMPERATURE OF A POWER SEMICONDUCTOR

(71) Applicant: MITSUBISHI ELECTRIC CORPORATION, Tokyo (JP)

(72) Inventors: Chihiro Kawahara, Rennes (FR); Julio Brandelero, Rennes (FR); Stefan Mollov, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 502 days.

(21) Appl. No.: 17/789,721

(22) PCT Filed: Dec. 17, 2020

(86) PCT No.: PCT/JP2020/048325
§ 371 (c)(1),
(2) Date: Jun. 28, 2022

(87) PCT Pub. No.: WO2021/149451
PCT Pub. Date: Jul. 29, 2021

(65) Prior Publication Data
US 2023/0053137 A1 Feb. 16, 2023

(30) Foreign Application Priority Data

Jan. 21, 2020 (EP) ...................... 20152878

(51) Int. Cl.
*G01K 3/00* (2006.01)
*G01K 7/18* (2006.01)
*G01K 7/34* (2006.01)

(52) U.S. Cl.
CPC ............ *G01K 3/005* (2013.01); *G01K 7/183* (2013.01); *G01K 7/34* (2013.01); *G01K 2217/00* (2013.01)

(58) Field of Classification Search
CPC ........... G01K 3/005; G01K 7/183; G01K 7/34; G01K 2217/00; G01K 3/00; G01K 7/18
See application file for complete search history.

(56) References Cited

U.S. PATENT DOCUMENTS

| 6,055,489 A | * | 4/2000 | Beatty ...................... G01K 7/01 |
| | | | 374/173 |
| 2006/0028264 A1 | * | 2/2006 | Nadd ...................... G01K 1/024 |
| | | | 374/E1.004 |

(Continued)

FOREIGN PATENT DOCUMENTS

| CN | 208727642 U | * | 4/2019 |
| DE | 1012006005033 A1 | * | 8/2007 |
| DE | 102008051467 A | * | 4/2010 |

OTHER PUBLICATIONS

Teschler, "How and when MOSFETs blow up", Power Electronic Tips, NPL: https://www.powerelectronictips.com/how-and-when-mosfets-blow-up/ (2016). (Year: 2016).*

(Continued)

*Primary Examiner* — Laura Martin
*Assistant Examiner* — Julia Fitzpatrick
(74) *Attorney, Agent, or Firm* — Birch, Stewart, Kolasch & Birch, LLP (57) ABSTRACT

The present invention concerns a device and a method for sensing an over-temperature of a power semiconductor. The invention: provides a current pulse source through control electrodes of the power semiconductor, duplicates the current provided by the current pulse source and provides the duplicated current to an emulating device, compares the voltage across the control electrodes to the voltage across the emulating device, notifies the result of the comparison.

13 Claims, 5 Drawing Sheets

(56) References Cited

U.S. PATENT DOCUMENTS

2019/0028265 A1* 1/2019 Bisti .................... G06F 21/606
2019/0207591 A1* 7/2019 Choi .................... H03K 3/0315

OTHER PUBLICATIONS

International Search Report for PCT/JP2020/048325 mailed on Apr. 29, 2021.
Written Opinion of the International Searching Authority for PCT/JP2020/048325 mailed on Apr. 29, 2021.

* cited by examiner

DEVICE AND METHOD FOR SENSING AN OVER-TEMPERATURE OF A POWER SEMICONDUCTOR

TECHNICAL FIELD

The present invention relates generally to a device and a method for sensing an over-temperature of a power semiconductor.

BACKGROUND ART

Power semiconductor devices are made to work below a maximum junction temperature. The operation over the maximum junction temperature may trigger a thermal runway condition that can lead to an irreversible and catastrophic failure of the power semiconductor device. The operation over the maximum junction temperature may be caused by different situations such as a defective cooling system, transient operation of the power semiconductor over its specifications, ageing and others.

Nowadays, power semiconductor devices like transistors with embedded diode used as a sensor for the chip temperature are used. The diode forward voltage drop is dependent on the temperature. This solution leads to a loss of the transistor available active area and increases the number of connections to the power semiconductor.

Direct measurements of the junction temperature using thermocouples or negative temperature coefficient resistors are not compatible to detect the over-temperature, given the low bandwidth of the sensors and the fact that they can't be placed close to the power semiconductor.

Optical measurements of the temperature are also slow since they require digital treatment and calibration which increase the latency.

The use of thermally sensitive electrical parameters of the power semiconductor is promising. For example the temperature of the power semiconductor may be observed by the injection of a measurement current into the active power semiconductor to measure the on-state voltage that is dependent of the temperature.

Consequently, as this measurement needs to occur in a known state of conducted current or calibrated for all conducted currents, this increases the complexity of the measurement circuit and furthermore the precision associated to this measurement may not be enough and thus may cause false triggers.

SUMMARY OF INVENTION

The present invention aims to provide a low complexity and accurate device and method for sensing an over-temperature of a power semiconductor.

To that end, the present invention concerns a device for sensing an over-temperature of a power semiconductor, characterized in that the device comprises:
- a current pulse source that is provided through control electrodes of the power semiconductor,
- a current copier that duplicates the current provided by the current pulse source, and that provides the duplicated current to an emulating device,
- a comparator that compares the voltage across the control electrodes to the voltage across the emulating device,
- means for notifying the result of the comparison.

The present invention concerns also a method for sensing an over-temperature of a power semiconductor, characterized in that the method comprises the steps of:
- applying a current pulse through control electrodes of the power semiconductor,
- duplicating the current pulse and providing the duplicated current pulse to an emulating device,
- comparing the voltage across the control electrodes to the voltage across the emulating device,
- notifying the result of the comparison.

Thus, the present invention can detect an over temperature of the power semiconductor and avoid a thermal runaway without complexity. Due to the emulating device, it is not necessary to introduce any analogue to digital converter to read the actual temperature.

According to a particular feature, the means for notifying the result of the comparison further control the switching pattern of the power semiconductor according to the signal outputted by the comparator.

According to a particular feature, the control electrodes the current source is applied to are a gate and an emitter or a gate and a source.

According to a particular feature, the current pulse source is provided to the power semiconductor when the power semiconductor is not switching or in a transition mode.

Thus, the user can decide to stop or slow down the power semiconductor to protect the thermal runaway. Furthermore, the voltage at the control electrodes only changes according to the current pulse and the electromagnetic and other interferences do not interfere during the sensing of the over temperature of the power semiconductor.

According to the invention, the emulating device is composed of a resistor and a capacitor connected in series.

Thus, the emulating device has the same impedance as the internal gate of the power semiconductor at a given temperature, like for example a temperature just below the maximum junction temperature. The emulating device is used to create a threshold value which changes according to the current pulse source. Then the comparison between the voltage at the electrode of the power semiconductor to the voltage at the emulating device is independent of the current pulse source values.

According to the invention, the capacitor value is equal or lower than a gate capacitance value of the power semiconductor.

Thus, the present invention can prevent false alarm at the output of the comparator.

According to the invention, the resistor value is equal or lower than an internal gate resistance value of the power semiconductor when the power semiconductor is at a temperature almost equal to the maximum junction temperature of the power semiconductor.

Thus, it is possible to define the threshold temperature, which is equal or lower than the maximum junction temperature of the power semiconductor.

According to the invention, the resistor value is adjusted during a calibration phase.

Thus, it is possible to compensate the variation of the internal gate resistance of each power semiconductor.

According to the invention, the current pulse duration is equal to:

$$t_{max} < \frac{|Vsupply - V_{th}| - R_G \cdot I}{I} \cdot C_G$$

where Vth stands for the threshold voltage for the gate of semiconductor, Vsupply is the negative gate voltage that prevents the power semiconductor to turn-on or Vsupply is the positive gate voltage that prevents the power semiconductor to turn-off, Rg is the internal gate resistance value of the power semiconductor when the power semiconductor is at a temperature almost equal to the maximum junction temperature of the power semiconductor, Cg is the gate capacitance value of the power semiconductor and I is the current pulse value.

Thus, the state of the power semiconductor is maintained the same during the pulse duration.

According to the invention, the device further comprises at least one resistor and at least one comparator, a first terminal of the at least one resistor being connected to the current copier and a second terminal of the at least one resistor being connected to the emulating device and the at least one comparator compares the voltage at the electrode of the power semiconductor to the voltage at the second terminal of the at least one resistor.

According to the invention, the method further comprises the step of adjusting the resistor value of the emulating device when the power semiconductor is heated at a predetermined temperature.

BRIEF DESCRIPTION OF DRAWINGS

The characteristics of the invention will emerge more clearly from a reading of the following description of example embodiments, the said description being produced with reference to the accompanying drawings.

DESCRIPTION OF EMBODIMENTS

Figure 1:
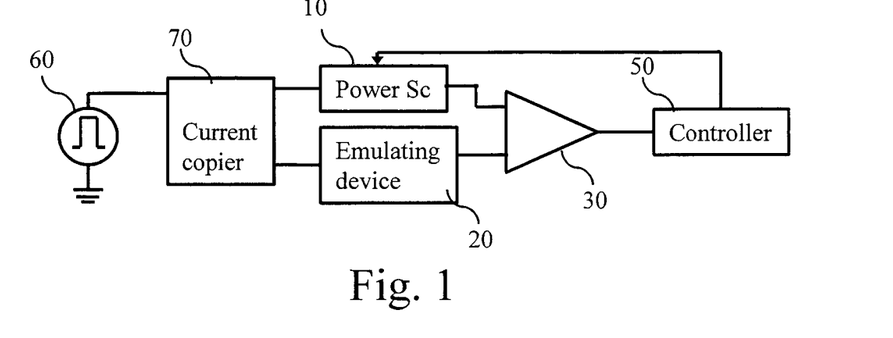
FIG. 1 represents an example of the architecture of a device for sensing the temperature of a power semiconductor device according to the invention.

FIG. 1 represents an example of the architecture of a device for sensing the temperature of a power semiconductor device according to the invention.

The device for sensing the temperature of a power semiconductor comprises a current copier 70 that duplicates the current provided by a current pulse source 60 through control electrodes of a power semiconductor Sc 10 when the power semiconductor is not switching or in a transition mode.

Control electrodes are a gate and an emitter or a gate and a source.

The duplicated current is provided to an emulating device 20.

The sensed voltage across the gate and the emitter or the gate and the source voltage of the power semiconductor 10 is provided to a comparator 30 that compares the voltage of the emulating device 20.

In a variant, instead of sensing the voltage across the control electrodes to the voltage across the emulating device, the voltage is sensed across one control electrode and a reference, like for example, the ground.

If the voltage of the emulating device is upper than the sensed electrode voltage of the power semiconductor 10, the output of the comparator 30 reaches high level.

The device for sensing the temperature of a power semiconductor comprises a controller 50 that notifies the result of the comparison by transferring a predetermined signal or a predetermined message or generates a predetermined information through a man machine interface.

In a particular mode of realization, the controller further controls the gate to source voltage of the power semiconductor and modifies the gate to source voltage patterns applied to the power semiconductor device during operation in order to reduce the junction temperature of the power semiconductor 10.

The emulating device is an emulating impedance which is representative of the input impedance, like the one of the gate/emitter path, of the power semiconductor 10 at the desired temperature to be detected.

The pulse duration of the pulse current source 60 is controlled to certain periods, typically several microseconds, to avoid switching-on or switching-off the power semiconductor. Then, the voltage across the real transistor is compared to the voltage across the emulating impedance. Thus, when the voltage measured is higher than the voltage at the emulating device, meaning that the gate resistance has a higher value than the emulating device one, the junction temperature of the power semiconductor 10 is hotter than the target point, the comparator 30 outputs a signal indicating the temperature overrun. Finally, the over temperature signal is fed to the controller 50 that notifies the result of the comparison.

In a particular mode of realization, the controller 50 further reduces switching speed of power semiconductor or stops switching for a moment.

The present invention permits to detect the over temperature during the normal operation of the power semiconductor, without any additional device near the power semiconductor, with a fast bandwidth, without any analogue to digital converter or need for digital processing.

Figure 2:
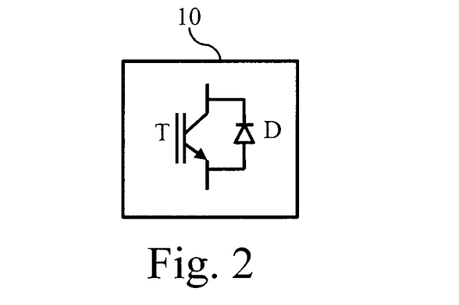
FIG. 2 represents an example of a power semiconductor.

FIG. 2 represents an example of a power semiconductor.

The power semiconductor is for example a transistor T and a diode D the anode of which is connected to the emitter of the transistor T and the cathode of which is connected to the collector of the transistor T.

Figure 3:
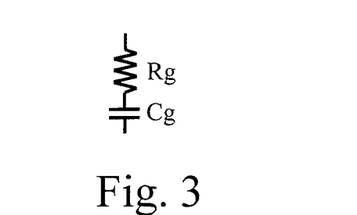
FIG. 3 represents the electric equivalent circuit of the power semiconductor according to the present invention.

FIG. 3 represents the electric equivalent circuit of the power semiconductor according to the present invention.

The electric equivalent circuit of the power semiconductor is composed of a resistor Rg connected in series with a capacitor Cg.

The present invention utilises the internal gate resistance to infer the junction temperature. The internal gate resistance is created by the polysilicon layer in Field Effect Transistors which is already present in the classical structures of the transistor. In the case of typical transistors, the value of the resistance increases as the temperature increases.

Figure 4:
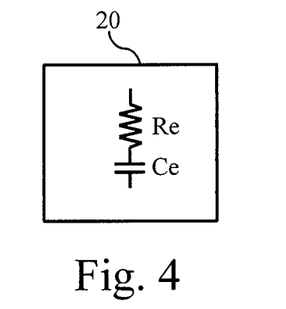
FIG. 4 represents an example of an emulating device that is used for sensing the temperature of a power semiconductor according to the present invention.

FIG. 4 represents an example of an emulating device that is used for sensing the temperature of a power semiconductor according to the present invention.

The emulating device 20 is composed of a resistor Re connected in series with a capacitor Ce.

The resistor Re has the same value as Rg at the maximum safe temperature operation and the capacitor Ce is for example a high-stability (such as COG) capacitor with the same value as Cg.

Figure 5:
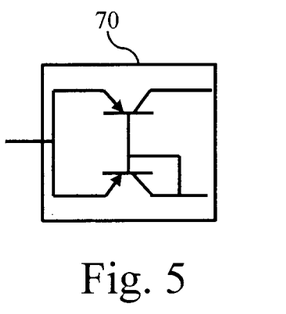
FIG. 5 represents an example of a current copier that is used for sensing the temperature of a power semiconductor device according to the present invention.

FIG. 5 represents an example of a current copier that is used for sensing the temperature of a power semiconductor according to the present invention.

The current copier 70 is for example composed of gain-matched transistor pairs.

Figure 6:
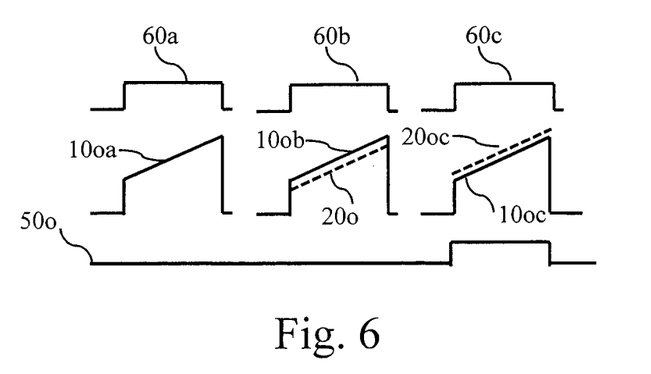
FIG. 6 represents signals that are used for sensing the temperature of a power semiconductor according to the present invention.

FIG. 6 represents signals that are used for sensing the temperature of a power semiconductor according to the present invention.

The waveforms of the pulsed current 60, the voltages 10o of the power semiconductor 10 and the voltage of the emulating device 20 and the over-temperature signals 50o are shown in FIG. 6 for three pulses.

For the first pulse 60a, the power semiconductor 10 temperature is equal to the maximum junction temperature. For the second pulse 60b, the power semiconductor 10 temperature is inferior to the maximum junction temperature. The voltage 10ob is upper than the voltage 20ob. For the third pulse 60c, the power semiconductor temperature is superior to the temperature threshold i.e. the maximum junction temperature. The voltage 20oc is upper than the voltage 10oc and the output signal 50o of the comparator 30 changes of state. In the Example of FIG. 6, Ce=Cg is assumed and the temperature variations are solely due to the temperature variance of the power semiconductor gate resistance.

Figure 7:
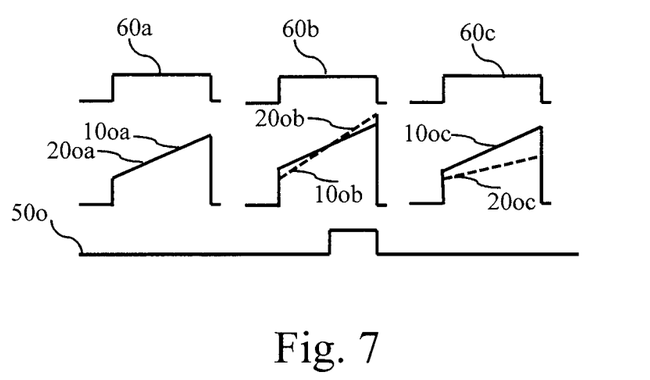
FIG. 7 represents signals that may occur when at least one component value of the emulating device is not accurately defined.

FIG. 7 represents signals that may occur when at least one component value of the emulating device is not accurately defined.

According to the invention, the capacitor Ce is strictly smaller or equal to Cg, avoiding the generation of false alarms. As shown in FIG. 7, this condition is necessary and sufficient to maintain the voltage 10o inferior to the voltage 20o at the end of the current pulse for a resistor value Rg inferior to the resistor value Re. For the first pulse 60a, the capacitor value Ce is equal to the capacitor value Cg, no false alarm is possible, even for infinite pulse duration. In the second pulse 60b, the capacitor value Ce is superior to the capacitor value Cg, then even for a resistor value Rg smaller than the resistor value Re, a false trigger is outputted. Finally, in the third pulse 60c, the capacitor value Ce is lower than the capacitor value Cg, no false alarm is possible, even for infinite pulse duration.

Based on the fundamental equations of the power semiconductor 10 and the emulating device voltages, where I is the current value, and t is the time:

$$10o = R_g \cdot I + \frac{I}{C_g} \cdot t$$

$$20o = R_e \cdot I + \frac{I}{C_e} \cdot t$$

For Rg inferior to Re, the voltage 10o should be inferior to 20o at the end of the current pulse, t=tmax as per. Then:

$$C_e < \frac{t_{max}}{(R_g - R_e) + \frac{1}{C_g} \cdot t_{max}}$$

Where $$t_{max} < \frac{|Vsupply - V_{th}| - R_G \cdot I}{I} \cdot C_G$$

where Vth stands for the threshold voltage for the gate of semiconductor 10, Vsupply is the negative gate voltage that prevents the power semiconductor to turn-on or Vsupply is the positive gate voltage that prevents the power semiconductor to turn-off. Considering that the term, $R_g$-$R_e$ close to zero, then Ce<Cg.

In a particular feature, the resistor Re is set to a slightly smaller or equal value of the resistor Rg at the maximum temperature. The value of the resistor Re is calculated using the following formula:

$$R_e = R_g^{@Tmax} + \left(\frac{1}{C_g} - \frac{1}{C_e}\right) \cdot t_{cmp}$$

Where $R_g^{@Tmax}$ is the resistor value at maximum junction temperature.

Thus, the difference between the two capacitors is compensated and an over-temperature detection becomes possible in a detection time of the comparator, noted tcmp in FIG. 7.

Figure 8:
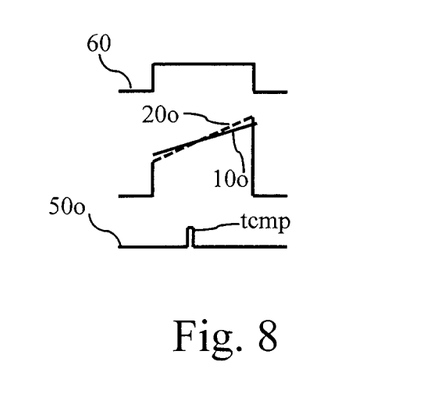
FIG. 8 represents signals that occur when the maximum junction temperature is detected.

FIG. 8 represents signals that occur when the maximum junction temperature is detected.

In case of the detection time tcmp is too short and not easily detected, it is possible to introduce a latching circuit with set/reset function for the output of comparator.

Figure 9:
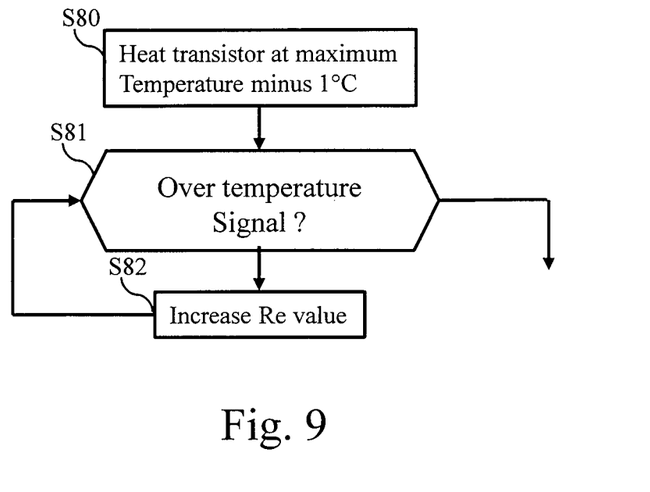
FIG. 9 represents an example of an algorithm that is used for adjusting the value of a resistor of the emulating power semiconductor.

FIG. 9 represents an example of an algorithm that is used for adjusting the value of a resistor of the emulating power semiconductor.

At step S80, the power semiconductor is heated at a predetermined temperature, for example at the maximum junction temperature minus one degree.

At step S81, the over-temperature signal outputted by the comparator 30 is checked. If the signal is at high level, the algorithm moves to step S81. Otherwise, the present algorithm is interrupted.

At step S82, the resistor value Re value is adjusted using a laser trimming technique or fuse blowing.

In a particular feature, the resistor value Re is adjusted by an increment if the over-temperature signal outputted by the comparator is in high level. For example, the increment is equal to 1000 ppm of the estimated Rg resistor value, e.g. 5 mΩ for Rg with a nominal value of 5Ω.

After that, the algorithm returns to step S81.

Figure 10:
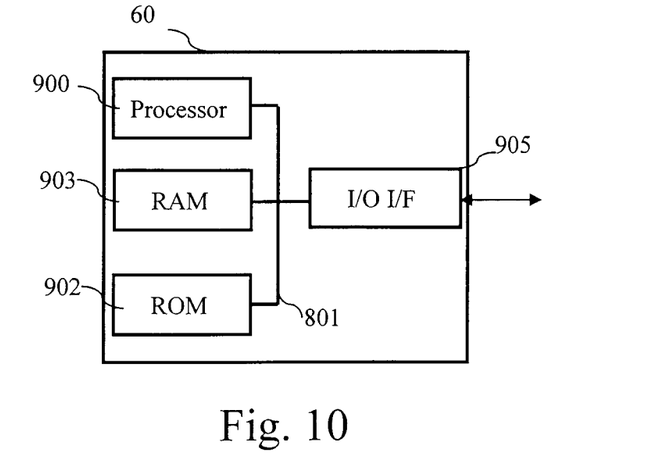
FIG. 10 represents an example of the architecture of a device for sensing the temperature of a power semiconductor device according to the present invention.

FIG. 10 represents an example of the architecture of a device for sensing the temperature of a power semiconductor device according to the present invention.

The device 60 has, for example, an architecture based on components connected together by a bus 901 and a processor 900 controlled by a program.

The bus 901 links the processor 900 to a read only memory ROM 902, a random access memory RAM 903, and an input output I/O interface I/F 905.

The input output interface I/F 905 comprises the current pulse source, the current copier 70, the emulating device 20 and the comparator 30.

Figure 12:
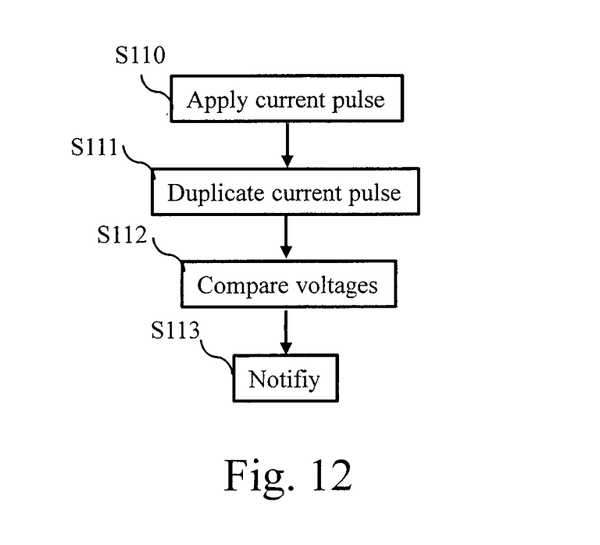
FIG. 12 represents an example of an algorithm for sensing the temperature of a power semiconductor device according to the invention.

The memory 903 contains registers intended to receive variables and the instructions of the program related to the algorithm disclosed in FIG. 12.

The read-only memory, or possibly a flash memory 902, contains instructions of the program related to the algorithm disclosed in FIG. 12.

When the device is powered on, the instructions stored in the memory 903 are transferred to the random access memory 903.

The device may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the device includes circuitry, enabling the controller 50 to perform the program.

The device 60 controls the gate signal of the semiconductor through the input output I/O interface I/F 905, controls the switching of the power semi conductor and may control a laser triming device for adjusting the value of the resistor of the emulating device.

Figure 11:
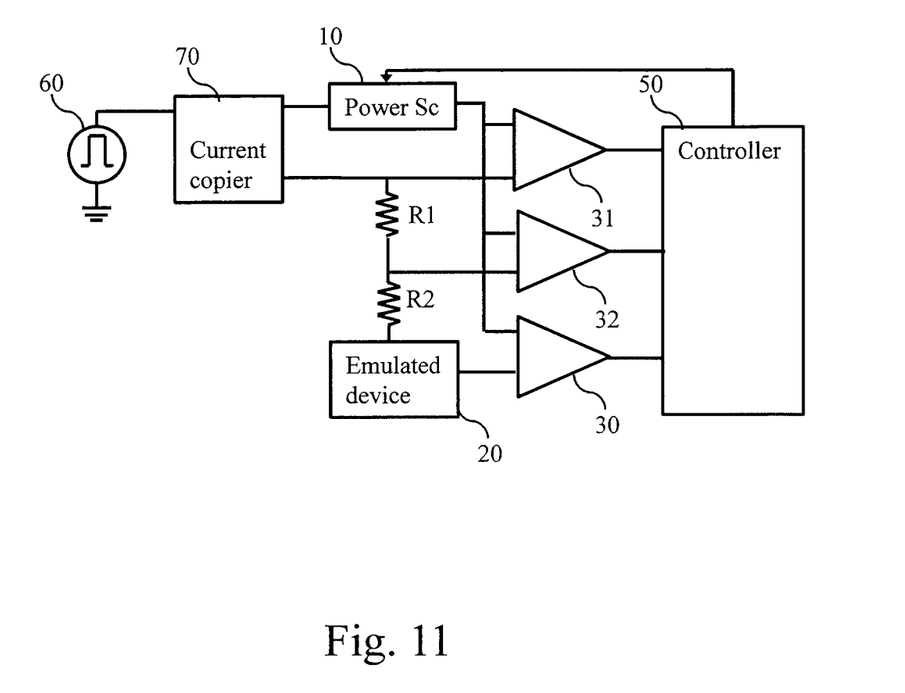
FIG. 11 represents another example of the architecture of a device for sensing the temperature of a power semiconductor device according to the invention.

FIG. 11 represents another example of the architecture of a device for sensing the temperature of a power semiconductor device according to the invention.

The device for sensing the temperature of a power semiconductor 10 comprises a current copier 70 that duplicates the current provided by a current pulse source 60 through control electrodes of a power semiconductor Sc 10.

The duplicated current is provided to a first terminal of a resistor R1 and to a first input of a comparator 31.

A second terminal of the resistor R1 is connected to a first terminal of a resistor R2 and to a first input of a comparator 32.

A second terminal of the resistor R2 is connected to the emulating device 20.

It has to be noted here that in the example of FIG. 11, two resistors and two comparators are added to the device disclosed in FIG. 1. Only one resistor and one comparator may be added to the device disclosed in FIG. 1 or more than two resistors and two comparators may be added to the device disclosed in FIG. 1.

The sensed voltage across the control electrodes of the power semiconductor 10 is provided to the comparators 31, 32 and 33 that compares the voltage of the emulating device 20.

If the voltage of the emulating device 20 is upper than the sensed voltage across the control electrodes of the power semiconductor 10, the output of the comparator 30 reaches high level.

The device for sensing the temperature of a power semiconductor comprises a controller 50 that notifies the result of the comparison.

According to a particular feature, the controller 50 modifies the patterns applied to the power semiconductor device during operation in order to reduce the junction temperature of the power semiconductor 10.

The emulating device is an emulating impedance which is representative of the input impedance (gate/emitter path) of the power semiconductor 10 at the desired temperature to be detected.

Thus, different critical temperatures of the power semiconductor 10 may be detected. The resistor Re value is adjusted for a given temperature using one of the techniques described above. The resistor R1 and R2 values are chosen in function of the temperature sensitivity of the resistor Rg value multiplied by temperature steps. Taking the numerical example above, if the temperature steps are 5° C. and the temperature sensitivity is 5 mΩ/° C., thus the resistor R1 and R2 values are 25 mΩ.

The pulse duration of the pulse current source 60 is controlled to certain periods, typically several microseconds, to avoid switching-on or switching-off the power semiconductor. Then, the voltage across the electrode of the semiconductor is compared to the voltage across the emulating impedance.

FIG. 12 represents an example of an algorithm for sensing the temperature of a power semiconductor device according to the invention.

At step S110, a current pulse is applied through control electrodes of the power semiconductor.

At step S111, the current pulse is duplicated, and the duplicated current pulse is provided to the emulating device.

At step S112, the voltage across the control electrodes of the power semiconductor is compared to the voltage at the emulating device.

At step S113, the result of the comparison is notified.

The switching pattern of the power semiconductor may be also controlled according to the result of the comparison.

The invention claimed is:

1. A device for sensing an over-temperature of a power semiconductor, wherein the device comprises:
    a current pulse source that is provided through control electrodes of the power semiconductor,
    a current copier that duplicates the current provided by the current pulse source, and that provides the duplicated current to an emulating device,
    a comparator that compares the voltage across the control electrodes to the voltage across the emulating device, and
    a controller configured to notify the result of the comparison, wherein
    the emulating device comprises a resistor and a capacitor connected in series,
    the resistor value is equal or lower than a gate resistance value of the power semiconductor when the power semiconductor is at a temperature equal to one degree Celsius less than the maximum junction temperature of the power semiconductor.

2. The device according to claim 1, wherein the controller is configured to control the switching pattern of the power semiconductor according to the signal outputted by the comparator by modifying a pattern applied to the power semiconductor device based on the comparator indicating that the resistance of the power semiconductor is greater than the resistance of the resistor.

3. The device according to claim 1, wherein the control electrodes the current source is applied to are a gate and an emitter or a gate and a source.

4. The device according to claim 2, wherein the current pulse source is provided to the power semiconductor when the power semiconductor is not switching or in a transition mode.

5. The device according to claim 1, wherein the capacitor value is equal or lower than a gate capacitance value of the power semiconductor.

6. The device according to claim 5, wherein the resistor value is adjusted during a calibration phase.

7. The device according to claim 6, wherein the current pulse duration is equal to:

$$t_{max} < \frac{|Vsupply - V_{th}| - R_G \cdot I}{I} \cdot C_G$$

where Vth stands for the threshold voltage for the gate of the power semiconductor, Vsupply is the negative gate voltage that prevents the power semiconductor to turn-on or Vsupply is the positive gate voltage that prevents the power semiconductor to turn-off, Rg is the gate resistance value, Cg is the gate capacitance value of the power semiconductor and I is the current pulse value.

8. The device according to claim 1, wherein the device further comprises at least one other comparator,
a first terminal of the resistor is connected to the current copier and a second terminal of the resistor is connected to the emulating device and the at least one other comparator compares the voltage at the electrode of the power semiconductor to the voltage at the second terminal of the at least one resistor.

9. A method for sensing an over-temperature of a power semiconductor, wherein the method comprises the steps of:
applying a current pulse through control electrodes of the power semiconductor,
duplicating the current pulse and providing the duplicated current pulse to an emulating device,
comparing the voltage across the control electrodes to the voltage across the emulating device,
notifying the result of the comparison using a controller, wherein
the emulating device comprises a resistor and a capacitor connected in series, the resistor value is equal or lower than a gate resistance value of the power semiconductor when the power semiconductor is at a temperature equal to one degree Celsius less than the maximum junction temperature of the power semiconductor.

10. The method according to claim 9, wherein the method further comprises the step of adjusting the resistor value when the power semiconductor is heated at a predetermined temperature.

11. The device according to claim 1, wherein the equivalent circuit of the power semiconductor being composed of a gate capacitor and a resistor connected in series with the gate capacitor, and the capacitor value is equal or lower than the gate capacitance value of the power semiconductor.

12. The method according to claim 9, wherein the equivalent circuit of the power semiconductor being composed of a gate capacitor and a resistor connected in series with the gate capacitor, and the capacitor value is equal or lower than the gate capacitance value of the power semiconductor.

13. The method according to claim 1, wherein the controller is configured to control the switching pattern of the power semiconductor according to the signal outputted by the comparator by reducing a switching speed of the switching pattern of the power semiconductor based on the comparator indicating that the resistance of the power semiconductor is greater than the resistance of the resistor.

* * * * *